(12) United States Patent
Matsui et al.

(10) Patent No.: US 8,242,722 B2
(45) Date of Patent: Aug. 14, 2012

(54) CONTROLLER FOR ROTATING ELECTRICAL MACHINES

(75) Inventors: Satoshi Matsui, Hitachinaka (JP); Kohei Myoen, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 420 days.

(21) Appl. No.: 12/608,352

(22) Filed: Oct. 29, 2009

(65) Prior Publication Data

US 2010/0109586 A1 May 6, 2010

(30) Foreign Application Priority Data

Oct. 31, 2008 (JP) ................................. 2008-280679

(51) Int. Cl.
*H02P 6/16* (2006.01)
(52) U.S. Cl. ..................... 318/400.04; 318/803; 318/805
(58) Field of Classification Search ............. 318/400.04, 318/803, 805; 363/21.03, 131
See application file for complete search history.

(56) References Cited

U.S. PATENT DOCUMENTS

| | | |
|---|---|---|
| 2003/0051928 A1 | 3/2003 | Raftari et al. |
| 2010/0327786 A1* | 12/2010 | Aoki et al. ............... 318/400.04 |

FOREIGN PATENT DOCUMENTS

| | | |
|---|---|---|
| JP | 9-51700 A | 2/1997 |
| JP | 2002-95300 A | 3/2002 |
| JP | 2003-180001 A | 6/2003 |
| JP | 2003-235286 A | 8/2003 |
| JP | 2004-159400 A | 6/2004 |

OTHER PUBLICATIONS

European Office Action dated Aug. 22, 2011 (Four (4) pages).
Japanese Office Action dated Jan. 25, 2011 (four (4) pages).
European Search Report dated Mar. 18, 2010 (six (6) pages).

* cited by examiner

*Primary Examiner* — Karen Masih
(74) *Attorney, Agent, or Firm* — Crowell & Moring LLP (57) ABSTRACT

A controller for rotating electrical machines comprises a processing unit, to which a plurality of parameters are input, for generating a switching instruction to control a switching operation of a switching semiconductor device and outputting a signal corresponding to the switching instruction to a power converter. The processing unit includes at least a function to input thereto signals having been output from each of sensors such as a current sensor to detect current passed between the power converter and a winding of an armature, a temperature sensor to detect temperature of the winding of the armature, and a magnetic pole position sensor to detect magnetic pole position of a magnetic field system, and, based upon information on current, temperature, and rotation speed of the rotating electrical machines, having been obtained from those sensor signals, detects a magnetic flux that interlinks with the winding of the armature from a permanent magnet.

8 Claims, 6 Drawing Sheets

CONTROLLER FOR ROTATING ELECTRICAL MACHINES

INCORPORATION BY REFERENCE

The disclosure of the following priority application is herein incorporated by reference: Japanese Patent Application No. 2008-280679 filed Oct. 31, 2008.

BACKGROUND OF THE INVENTION

1. Field of the Invention

The present invention relates to a controller for rotating electrical machines, typically to a highly accurate flux detection technology.

2. Description of Related Art

In rotating electrical machines including a permanent magnet in the magnetic field system, the permanent magnet flux changes due to temperature rise. Moreover, when irreversible demagnetization is caused due to overheating, torque fluctuates and thus a desired output can not be obtained. For this reason, in rotating electrical machines having a permanent magnet in the magnetic field system, it is necessary to detect an interlinkage magnetic flux in the armature. As background arts for detecting an interlinkage magnetic flux in an armature, there are techniques of flux estimation or flux measurement known in the related arts, which are disclosed in, for instance, patent reference literatures 1 and 2.

Patent reference literatures 1 and 2 disclose two types of techniques. One of them includes a flux table for temperature of a permanent magnet or an armature winding, to use detected temperature of the permanent magnet or the armature winding as a reference parameter so as to obtain a magnetic flux from the flux table. The other includes a motor model or a flux estimator, to use measured value or command value of voltage, current, and rotation speed of rotating electrical machines as an input parameter so as to obtain a magnetic flux from the motor model or the flux estimator.

Patent Reference Literature 1: Japanese Laid-Open Patent Publication No. H9-51700, Patent Reference Literature 2: Japanese Laid-Open Patent Publication No. 2002-95300.

As in the former, the method using a flux table for temperature assumes a one-to-one relationship between the temperature and the magnetic flux. However, magnetic flux of a permanent magnet changes not only due to the temperature but also due to reversed magnetic field over the permanent magnet, i.e., current flowing through the armature winding. Therefore, it is necessary to sufficiently consider a change of magnetic flux of the permanent magnet due to current, so as to accurately obtain interlinkage magnetic flux in the armature.

As in the latter, in the method using a motor model or a flux estimator, it is necessary to subtract voltage drop in the armature winding from the terminal voltage of rotating electrical machines, so as to calculate the magnetic flux. However, voltage drop in the armature winding changes relative to the magnitude of the resistance of the armature winding. In addition, the magnitude of the resistance of the armature winding changes relative to the temperature change. Therefore, it is necessary to sufficiently consider the relationship between them so as to accurately obtain interlinkage magnetic flux in the armature.

SUMMARY OF THE INVENTION

The present invention provides a controller for rotating electrical machines that accurately detects interlinkage magnetic flux in an armature.

A controller for rotating electrical machines according to a first aspect of the present invention is used in a system comprising a rotating electrical machine and a power converter. The rotating electrical machine is provided with an armature including a winding and a magnetic field system including a permanent magnet. The power converter is electrically connected to the winding of the armature and controls electric power which is input to or output from the winding of the armature by a switching semiconductor device. The controller controls operation of the power converter so as to control operation of the rotating electrical machine. The controller comprises a processing unit, to which a plurality of parameters are input, for generating a switching instruction to control a switching operation of the switching semiconductor device and outputting a signal corresponding to the switching instruction to the power converter. The processing unit includes at least a function to input thereto signals having been output from each of sensors such as a current sensor to detect current passed between the power converter and the winding of the armature, a temperature sensor to detect temperature of the winding of the armature, and a magnetic pole position sensor to detect magnetic pole position of the magnetic field system, and, based upon information on current, temperature, and rotation speed of the rotating electrical machines, having been obtained from those sensor signals, detects a magnetic flux that interlinks with the winding of the armature from the permanent magnet.

According to a second aspect of the present invention, in the controller for rotating electrical machines of the first aspect, it is preferable that a resistance value of the winding of the armature is preset in the processing unit as a value necessary for detection of the interlinkage magnetic flux and the processing unit corrects the winding resistance value based upon the temperature information.

According to a third aspect of the present invention, in the controller for rotating electrical machines of the first or second aspect, the processing unit may include a flux observer that is constituted by a model of the rotating electrical machine and a proportional integrator, and may detect the interlinkage magnetic flux by using the flux observer.

According to a fourth aspect of the present invention, in the controller for rotating electrical machines of any one of the first through third aspects, it is preferable that a magnitude of magnetic flux between a magnetic flux in an initial state of magnetization of the permanent magnet and a magnetic flux when demagnetization of the permanent magnet occurs is preset in the processing unit as a first flux threshold, and when the interlinkage magnetic flux having been detected is greater than the first flux threshold and less than the magnetic flux in the initial state of magnetization of the permanent magnet, the processing unit increases a component of current flowing through the winding of the armature, the component affecting torque of the rotating electrical machine.

According to a fifth aspect of the present invention, in the controller for rotating electrical machines of the fourth aspect, it is more preferable that a magnitude of magnetic flux less than the first flux threshold, between the magnetic flux in the initial state of magnetization of the permanent magnet and the magnetic flux when demagnetization of the permanent magnet occurs, is preset in the processing unit as a second flux threshold; and when the interlinkage magnetic flux having been detected is equal to or less than the first flux threshold and less than the second flux threshold, the processing unit limits current flowing through the winding of the armature so as to limit an output of the rotating electrical machine.

According to a sixth aspect of the present invention, in the controller for rotating electrical machines of the fifth aspect, when the interlinkage magnetic flux having been detected is equal to or less than the second flux threshold and greater than the magnetic flux when demagnetization of the permanent magnet occurs, the processing unit may deactivate the rotating electrical machine.

A controller for rotating electrical machines according to a seventh aspect of the present invention is used in a system comprising a rotating electrical machine and a power converter. The rotating electrical machine is provided with an armature including a winding and a magnetic field system including a permanent magnet. The power converter is electrically connected to the winding of the armature and controls electric power which is input to or output from the winding of the armature by a switching semiconductor device. The controller controls operation of the power converter so as to control operation of the rotating electrical machine. The controller comprises a processing unit, to which a plurality of parameters are input, for generating a switching instruction to control a switching operation of the switching semiconductor device and outputting a signal corresponding to the switching instruction to the power converter. The processing unit includes a function to detect a magnetic flux that interlinks with the winding of the armature from the permanent magnet, and a magnitude of magnetic flux between a magnetic flux in an initial state of magnetization of the permanent magnet and a magnetic flux when demagnetization of the permanent magnet occurs is preset in the processing unit as a first flux threshold. When the interlinkage magnetic flux having been detected is greater than the first flux threshold and less than the magnetic flux in the initial state of magnetization of the permanent magnet, the processing unit increases a component of current flowing through the winding of the armature, the component affecting torque of the rotating electrical machine.

According to an eighth aspect of the present invention, in the controller for rotating electrical machines of the seventh aspect, it is preferable that a magnitude of magnetic flux less than the first flux threshold, between the magnetic flux in the initial state of magnetization of the permanent magnet and the magnetic flux when demagnetization of the permanent magnet occurs, is preset in the processing unit as a second flux threshold, and when the interlinkage magnetic flux having been detected is equal to or less than the first flux threshold and less than the second flux threshold, the processing unit limits current flowing through the winding of the armature so as to limit an output of the rotating electrical machine According to a ninth aspect of the present invention, in the controller for rotating electrical machines of the eighth aspect, when the interlinkage magnetic flux having been detected is equal to or less than the second flux threshold and greater than the magnetic flux when demagnetization of the permanent magnet occurs, the processing unit may deactivate the rotating electrical machine.

According to the present invention, a change of magnetic flux of the permanent magnet not only due to the temperature but also due to the reversed magnetic field over the permanent magnet, i.e., current flowing through the armature winding, is sufficiently considered so as to detect interlinkage magnetic flux. In addition, according to the present invention, the magnitude of the resistance of the armature winding due to the temperature of the armature winding is sufficiently considered so as to detect interlinkage magnetic flux.

According to the present invention, therefore, a controller for rotating electrical machines that accurately detects interlinkage magnetic flux in the armature can be provided.

DESCRIPTION OF PREFERRED EMBODIMENTS

An embodiment of the present invention is explained in reference to drawings.

In the embodiment below, the present invention is explained with an example adopted in a motor generator drive system of vehicles including a parallel hybrid drive system.

A parallel hybrid drive system has an internal combustion engine and a motor generator arranged in parallel in terms of energy flow relative to drive wheels (structurally, an engine and a motor generator are connected mechanically in series via a clutch, which is a power transmission control mechanism), so that drive wheels are driven either by rotating power of the engine, by rotating power of the motor generator, or by rotating power of both the engine and the motor generator.

There is a hybrid system in which rotary power of an internal combustion engine is used to drive a generator, the electric power generated thereby is used to drive a motor generator, and then the rotary power generated thereby is used to drive the drive wheels. This is known as a series hybrid, in which the energy flows in series from the engine to the drive wheels. There is another hybrid system known as a series-parallel hybrid, in which the parallel hybrid and the series hybrid are used in combination (a scheme in which a power transmission mechanism such as a planetary gear train is used to mechanically connect an engine and two motor generators, so as to distribute a part of the rotary power of the engine to the motor generator for generating power to generate electric power and so as to drive the motor generator for driving by electric power obtained thereby). The present invention may be adopted in a motor generator drive system of vehicles including those hybrid drive systems.

The present invention may also be adopted in a motor generator drive system of vehicles including a drive system in which electric power is the only power source.

There is a motor generator drive system for vehicles known as a simple hybrid system, in which a motor generator is mechanically connected to an engine via a belt. When the engine is started, in particular, when the engine is re-started after stopping idling, i.e., the engine is stopped when the vehicle is stopped and the engine is started again when the vehicle is started, the system causes the motor generator to work as a motor so as to supply the engine with driving force. Using the driving force of the engine, the system causes the motor generator to work as a generator so as to charge a battery that is a power source for the motor generator. There is another simple hybrid system in which so-called torque assist function is added to the simple hybrid system described above. Under high load operation such as when the vehicle is accelerated or the like, the torque assist function allows the vehicle to be driven by a driving force obtained by causing the motor generator to work as a motor which is added to the driving force of the engine. The present invention may be adopted in those simple hybrid systems.

Vehicles include standard vehicles such as hybrid electric vehicles with the hybrid system described above and pure electric vehicles with a drive system in which electric power is the only power source, large vehicles, which are heavier than standard vehicles, such as buses (transport vehicles) and trucks (freight vehicles), rail vehicles such as hybrid trains, specialist vehicles equipped with work devices such as forklift trucks used for unloading and vehicles used for construction works, and so forth.

The embodiment below is explained with an example of hybrid electric vehicles.

The embodiment explained below may be adopted in motor drive systems other than motor generator drive system for vehicles, for instance, industrial motor drive systems used to drive industrial machines and home motor drive systems used to drive home appliances. In particular, it is preferable to adopt in a drive system for rotating electrical machines including a permanent magnet in the magnetic field system.

Figure 1:
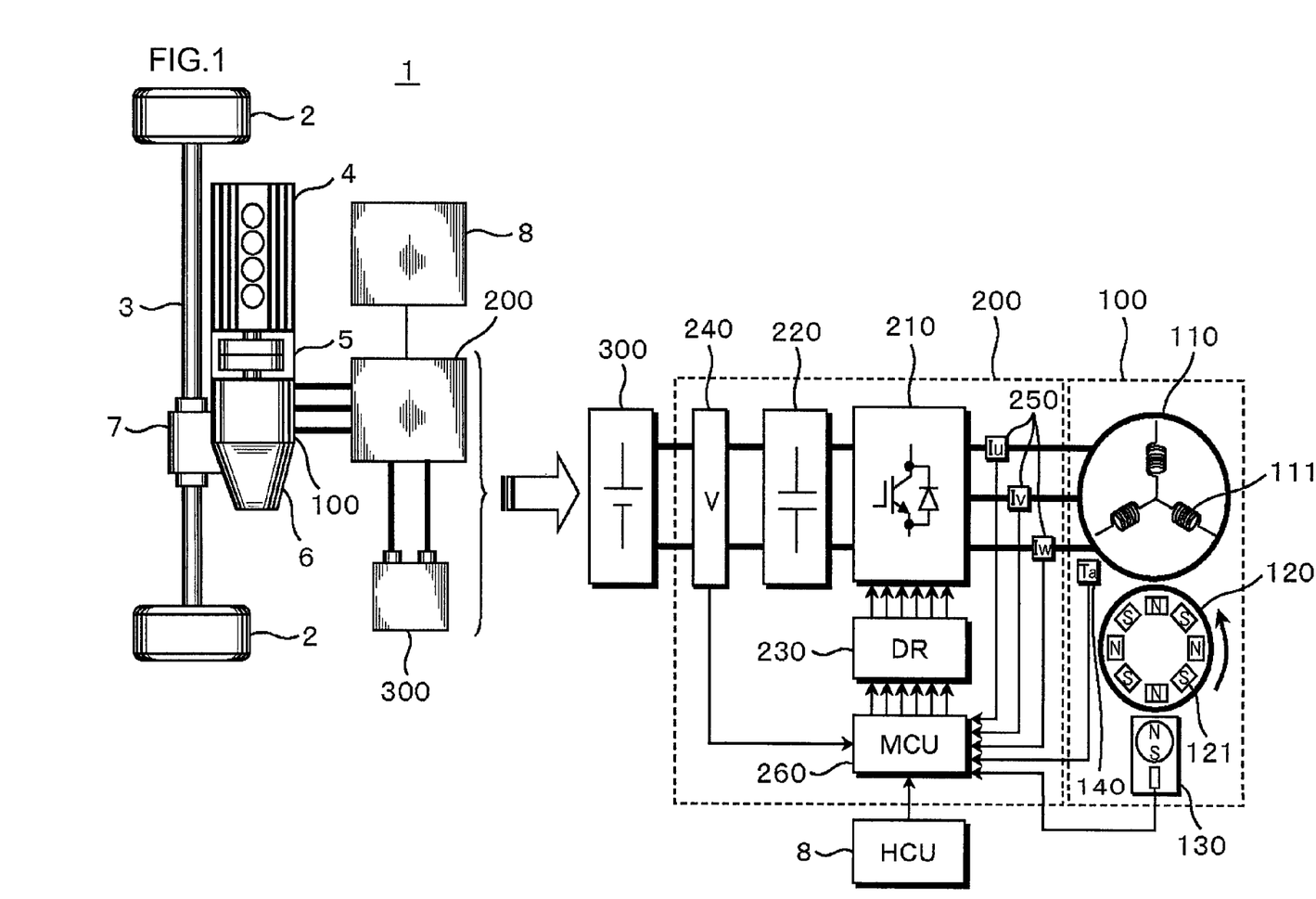
FIG. 1 shows the structure of a drive system of a hybrid electric vehicle that is an embodiment of the present invention.

The structure of the drive system of a hybrid electric vehicle 1 of the present embodiment is now explained in reference to FIG. 1.

The drive system of the hybrid electric vehicle (HEV) 1 of the present embodiment is constituted by two systems. One of them is an engine system which includes an internal combustion engine 4 as a power source. The engine system is used mainly as a drive source for the HEV 1. The other is a vehicle electric system which includes a motor generator 100 as a power source. The vehicle electric system is used mainly as a drive source for the HEV 1 and an electric power generation source for the HEV 1.

An axle 3 is rotatably supported in the front part of the vehicle body (not shown). A pair of front wheels 2 is provided at the two ends of the axle 3. An axle which is provided with a pair of rear wheels at the two ends thereof is rotatably supported in the rear part of the vehicle body (not shown). The HEV 1 of the present embodiment is a front-wheel drive vehicle in which the front wheels 2 are primary wheels, which are driven by the power, and the rear wheels (not shown) are secondary wheels, which follow the primary wheels. Another drive system such as a rear-wheel drive system or a four-wheel drive system may be adopted.

A differential gear (DEF) 7 is provided at the central part of the axle 3. The axle 3 is mechanically connected to the output side of the DEF 7. An output shaft of a transmission 6 is mechanically connected to the input side of the DEF 7. The DEF 7 is a differential power transfer mechanism that distributes the rotary driving force shifted and transmitted by the transmission 6 to the front axle 3 of right and left. The output side of the motor generator 100 is mechanically connected to the input side of the transmission 6. The output side of the engine 4 is mechanically connected to the input side of the motor generator 100 via a clutch 5, which is a power transmission control mechanism. The clutch 5 is shifted to an engaged state when the rotary power of the engine 4 is transmitted to the front wheels 2, while it is shifted to a disengaged state when the rotary power of the engine 4 is not transmitted to the front wheels 2, and thus the power transmission is controlled.

It is to be noted that the motor generator 100 and the clutch 5 are housed in a chassis of the transmission 6.

The motor generator 100 is a rotating electrical machine including an armature (referred to as a stator in the present embodiment) 110 that includes an armature winding 111 and a magnetic field system (referred to as a rotor in the present embodiment) 120, disposed opposite to the armature 110 via an air gap, that includes a permanent magnet 121. The motor generator 100 functions as a motor during powering operation and as a generator during power generation (during regenerative operation).

When the motor generator 100 functions as a motor, electrical energy stored in a battery 300 is supplied to the armature winding 111 via an inverter 200, which is a power converter. This causes the motor generator 100 to generate rotary power (mechanical energy) due to magnetic influence between the armature 110 and the magnetic field system 120. The generated rotary power is transmitted to the axle 3 via the transmission 6 and the DEF 7 so as to drive the front wheels 2. When the motor generator 100 functions as a generator, on the other hand, the motor generator 100 is driven by mechanical energy (rotary power) transmitted from the front wheels 2. This causes the motor generator 100 to generate electric power in the armature winding 111 due to magnetic influence between the armature 110 and the magnetic field system 120. The generated electric power is supplied to the battery 300 via the inverter 200 so as to be stored.

The drive of the motor generator 100 is controlled through electric power being controlled by the inverter 200 between the armature 110 and the battery 300. In other words, the inverter 200 is a controller for the motor generator 100. The inverter 200 is a power converter that converts electric power from direct current (DC) to alternate current (AC) and vice versa through switching operation of a switching semiconductor device. The inverter 200 includes a power module 210, a drive circuit 230 that drives the switching semiconductor device mounted on the power module 210, an electrolytic capacitor 220 that is electrically connected in parallel on the DC-side of the power module 210 so as to smooth DC voltage, and a motor control unit 260 that generates a switching instruction for the switching semiconductor device on the power module 210 and outputs a signal corresponding to the switching instruction to the drive circuit 230. The armature 110 and the battery 300 are electrically connected to the AC-side and on the DC-side of the power module 210, respectively.

In order to obtain an input parameter necessary to generate the switching instruction, an instruction signal having been output from a hybrid control unit 8, a voltage signal having been output from a voltage sensor 240, a rotational position signal having been output from a magnetic pole position sensor 130, current signals having been output from a current sensor 250, and a temperature signal having been output from a temperature sensor 140 are input to the motor control unit 260.

The hybrid control unit 8 is an electronic device that, based upon a plurality of state parameters indicating the driving condition of the vehicle such as torque requirement from the driver and vehicle velocity, generates a motor generator torque instruction for the motor control unit 260 and an engine torque instruction to an engine control unit (not shown), and outputs a signal corresponding to the motor generator torque instruction to the motor control unit 260 and outputs a signal corresponding to the engine torque instruction to the engine control unit.

The engine control unit is an electronic device that controls the drive of components of the engine 4 such as an air throttle valve, a fuel injection valve, an inlet and exhaust valve, and the like, which, based upon the engine torque instruction obtained from the output signal of the hybrid control unit 8, generates a drive instruction to each of the components and outputs signals corresponding to each of the drive instructions to drive circuits of each of the components.

The voltage sensor 240, provided in the inverter 200, is an electronic device to detect input and output voltages on the DC-side of the battery 300 or the power module 210. While in the present embodiment a voltage divider circuit that divides input voltage using a series connection circuit of resistance elements is adopted in the voltage sensor 240, another type of sensor may be adopted.

The magnetic pole position sensor 130, concentrically arranged on an axis of rotation of the motor generator 100, is an electronic device to detect the magnetic pole position of the magnetic field system 120 and the rotation speed of the magnetic field system 120. In the present embodiment, a resolver is used as the magnetic pole position sensor 130, which includes a stator having primary and secondary windings and a rotor having reluctance change of pairs of poles and detects reluctance change of the rotor using the primary and secondary windings of the stator. However, another sensor such as a MR sensor, a sensor using a magnetoresistive element such as a Hall element, and a sensor using an optical element such as an encoder may be used. In addition, a sensorless method that estimates the magnetic pole position through electrical characteristics such as induced voltage may be adopted in the magnetic pole position sensor 130.

The current sensor 250, provided in the inverter 200, is an electronic device to detect input and output currents between the AC-side of the power module 210 and the armature 110. While in the present embodiment a sensor that uses a magnetoresistive element such as a Hall element so as to detect magnetic flux generated in the core by current flowing through a conductor is adopted in the current sensor 250. However, another sensor such as one that applies a current to a shunt resistor and detects voltage generated at the two ends thereof may be adopted.

The temperature sensor 140, embedded in the armature winding 111, is an electronic device to detect temperature of the armature winding 111. While in the present embodiment a sensor using a thermoresistive element such as a thermistor is adopted in the temperature sensor 140, another sensor may be adopted.

The battery 300 is a high voltage electrical storage device with a nominal output voltage of 200V or higher, which constitutes a drive power source of the motor generator 100. A lithium ion battery or a nickel-metal hydride battery is used in the battery 300.

A battery (not shown) with a lower voltage than that of the battery 300 is electrically connected to the battery 300. The low voltage battery, electrically connected to the battery 300 via a DC-DC converter (not shown), is a lead acid battery with a nominal output voltage of 12V, which is an operational power supply for vehicle accessories such as lights and audio equipments, an electronic control device, and so on. The DC-DC converter is a power converter to convert DC electric power to buck-boost DC electric power of a predetermined voltage.

Figure 2:
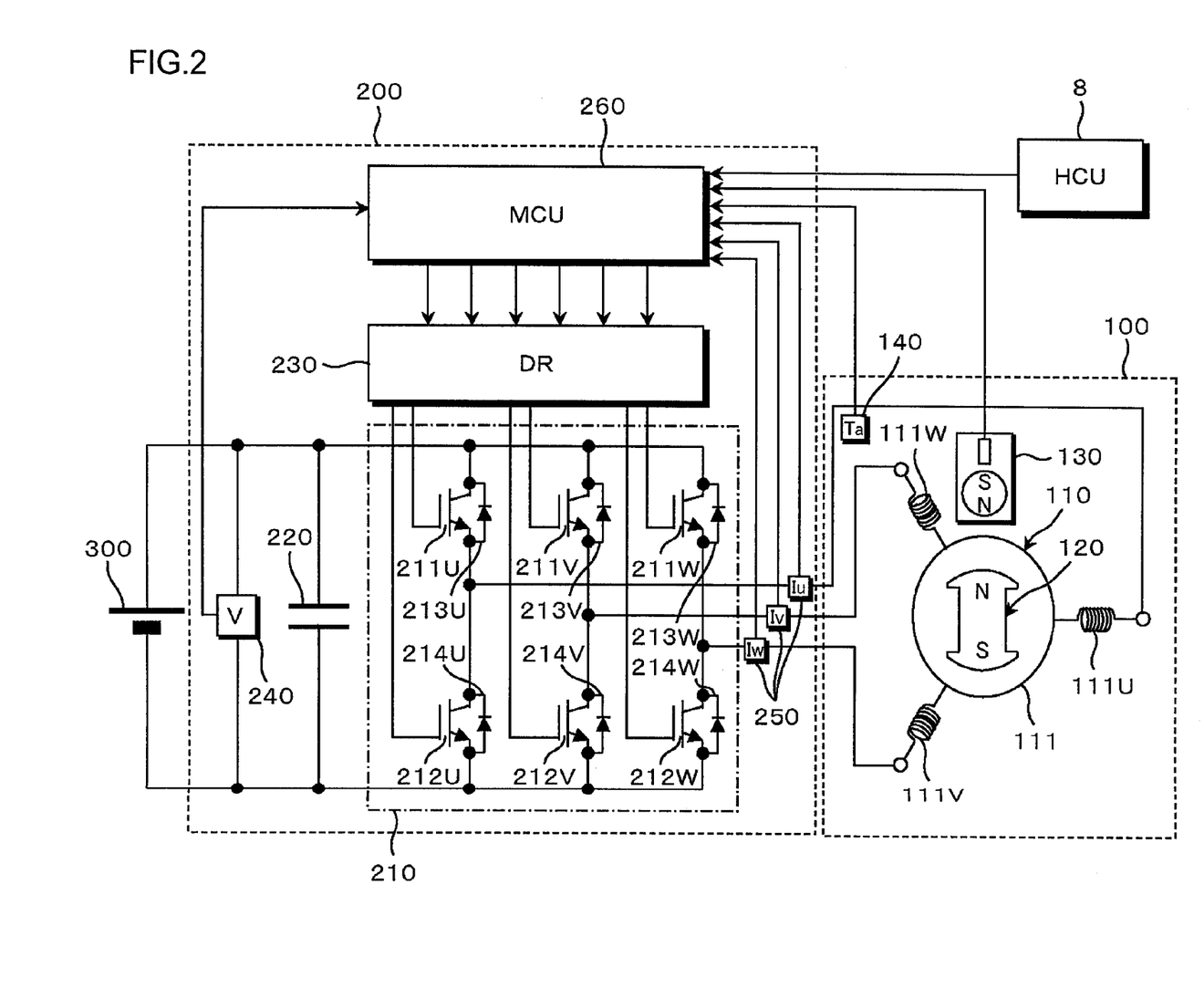
FIG. 2 shows the electrical circuit construction of the motor generator drive system shown in FIG. 1.

The electrical circuit construction of the motor generator drive system is now explained in reference to FIG. 2.

The motor generator 100 is a permanent magnet field type three-phase AC synchronous machine that includes the armature (stator) 110 having the armature winding 111 to which windings 111U, 111V, and 111W of three phases, U phase, V phase, and W phase respectively, which are wound on the core, are Y (star)-connected, and the magnetic field system (rotor) 120 having a plurality of the permanent magnets 121 embedded in the pole core. During powering operation, the magnetic field system 120 rotates in synchronization with the rotation speed of a rotating magnetic field due to magnetic influence between the armature 110, which generates a rotating magnetic field on reception of a supply of three-phase AC electric power, and the magnetic field system 120. During power generation, on the other hand, three-phase AC electric power is generated by interlinkage of magnetic flux of the magnetic field system 120 with the armature winding 111 due to rotation of the magnetic field system 120 and is output from the armature winding 111.

It is to be noted that although the armature winding 111 is constituted by three-phase windings in the present embodiment, it may be constituted by another polyphase windings such as two-phase windings or six-phase windings.

Although the armature winding 111 is constituted by a Y connection in the present embodiment, it may be constituted by a delta connection.

The armature winding 111 is electrically connected to the AC-side terminal of the power module 210. The power module 210, including six switching semiconductor devices, 211U, 211V, 211W, 212U, 212V, and 212W, constitutes a power converter circuit (main circuit) through which the electric power is converted from DC to AC and vice versa. More specifically, the power converter circuit is constituted by a series circuit referred to as an arm that is constituted by the switching semiconductor devices 211U, 211V, and 211W (emitter electrodes) constituting an upper arm and the switching semiconductor devices 212U, 212V, and 212W (collector electrodes) constituting a lower arm electrically connected in series with respect to each phase, and furthermore by the three-phase series circuits electrically connected in parallel (three-phase bridge connection). An IGBT is used as a switching semiconductor device.

It is to be noted that although an insulated gate bipolar transistor (IGBT) is used as a switching semiconductor device in the present embodiment, metal-oxide semiconductor field-effect transistor (MOSFET) may be used.

In the present embodiment, the power converter circuit is constituted in a three-phase bridge connection, corresponding to the number of phases of the armature winding 111. However, the power converter circuit is constituted in a two-phase bridge connection if the armature winding 111 is two-phase, and the power converter circuit is constituted in a six-phase bridge connection if the armature winding 111 is six-phase.

If the current that flows through each arm is high, each of the arms may be constituted by two or more switching semiconductor devices connected in parallel so as to disperse current flowing through the switching semiconductor devices and reduce the current flowing through each of the switching semiconductor devices.

Diodes are electrically connected in anti-parallel between the collector electrode and the emitter electrode of each of the six switching semiconductor devices 211U, 211V, 211W, 212U, 212V, and 212W. The connection relationships between each of the switching semiconductor devices and the diodes are as follows.

Switching semiconductor device 211U Diode 213U
Switching semiconductor device 212U Diode 214U
Switching semiconductor device 211V Diode 213V
Switching semiconductor device 212V Diode 214V
Switching semiconductor device 211W Diode 213W
Switching semiconductor device 212W Diode 214W

It is to be noted that since there is a parasitic diode in a MOSFET, it is not necessary to provide a diode device separately, unlike it is necessary to so in an IGBT.

The U phase winding 111U of the armature winding 111 is electrically connected to the midpoint of the U phase arm, i.e., the connection point of the emitter electrode of the switching semiconductor device 211U and the collector electrode of the switching semiconductor device 212U. Similarly, the V phase winding 111V of the armature winding 111 is electrically connected to the midpoint of the V phase arm, while the W phase winding 111W of the armature winding 111 is electrically connected to the midpoint of the W phase arm.

The positive pole-side of the battery 300 is electrically connected to one end side of the power converter circuit (bridge circuit), i.e., the collector electrodes of the switching semiconductor devices 211U, 211V, and 211W. On the other hand, the negative pole-side of the battery 300 is electrically connected to the other end side of the power converter circuit (bridge circuit), i.e., the emitter electrodes of the switching semiconductor devices 212U, 212V, and 212W. The electrolytic capacitor 220 is electrically connected in parallel at the two ends of the power converter circuit (bridge circuit). The electrolytic capacitor 220 smooths DC voltage applied from the battery 300 to the two ends of the power converter circuit (bridge circuit) or DC voltage applied from the two ends of the power converter circuit (bridge circuit) to the battery 300.

A gate drive signal is supplied from the drive circuit 230 to a gate electrode of each of the six switching semiconductor devices 211U, 211V, 211W, 212U, 212V, and 212W. This causes each of the six switching semiconductor devices 211U, 211V, 211W, 212U, 212V, and 212W to operate switching. The drive circuit 230, an electronic device which is constituted by a plurality of electronic components mounted on a circuit board, outputs a gate drive signal in response to a switching instruction having been output from the motor control unit 260 so as to supply the gate drive signal to a gate electrode of each of the six switching semiconductor devices.

The motor control unit 260 is an electronic device that receives the instruction signal having been output from the hybrid control unit 8, the voltage signal having been output from the voltage sensor 240, the current signals corresponding to three phases having been output from the current sensor 250, the rotational position signal having been output from the magnetic pole position sensor 130, and the temperature signal having been output from the temperature sensor 140, and uses a plurality of pieces of information (a torque instruction value, a DC voltage value, AC current values corresponding to three phases, a rotational position of the magnetic field system 120, and temperature of the armature winding 111) obtained from those signals as input parameters to control the motor generator 100 so as to calculate a switching instruction that is input to the drive circuit 230, and outputs a signal corresponding to the switching instruction to the drive circuit 230.

The motor control unit 260 is electrically connected to other electronic control devices such as the hybrid control unit 8 and the engine control unit via a controller area network (CAN) so as to transmit and receive a signal between the motor control unit 260 and those electronic control devices. This allows the motor control unit 260 to obtain information necessary to control the motor generator 100 from the other electronic control devices and to provide the other electronic control devices with information that the motor control unit 260 has.

It is to be noted that although a wired communication is adopted in the present embodiment, a wireless communication may be adopted.

Figure 3:
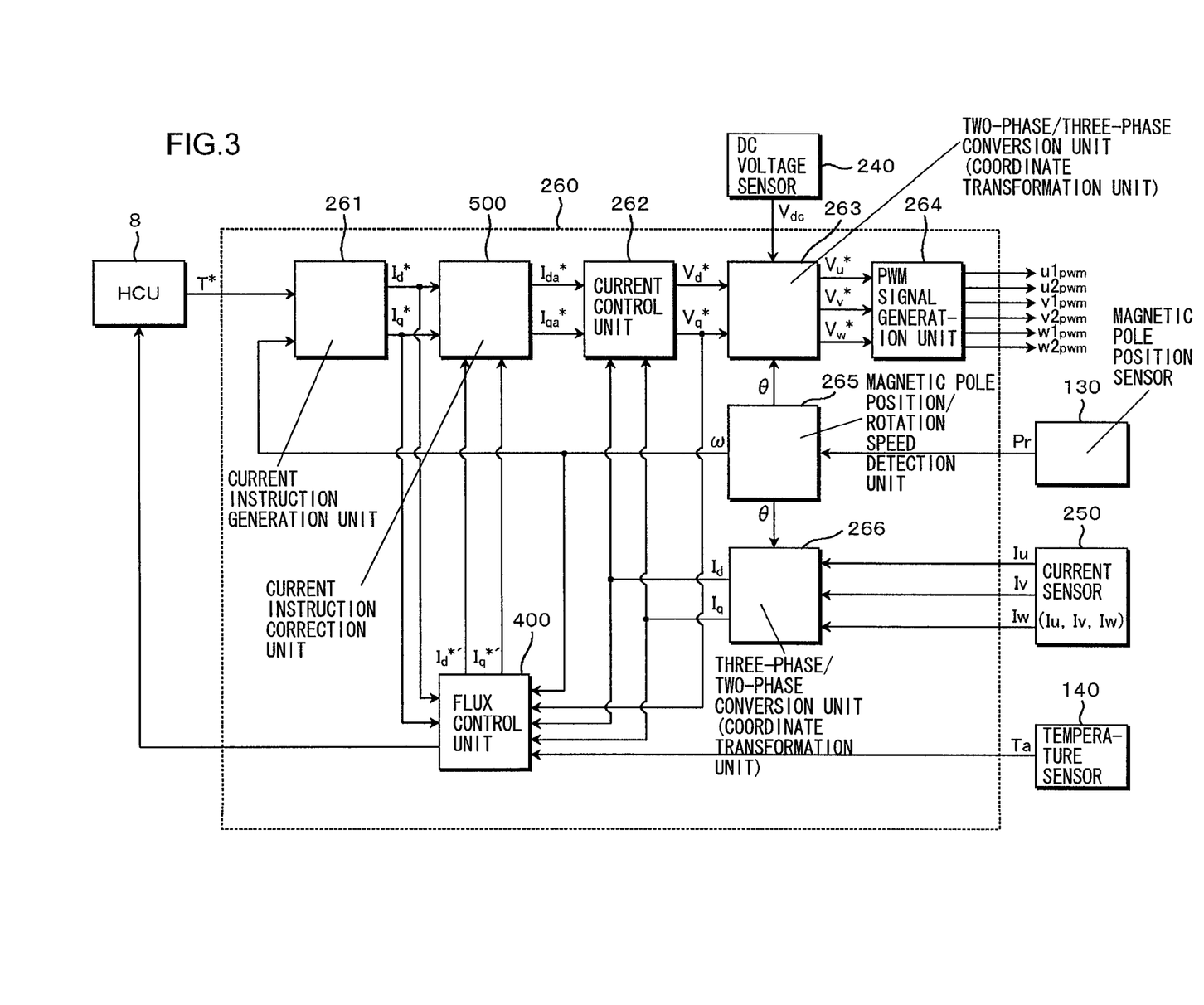
FIG. 3 shows the functional structure of the motor control unit shown in FIG. 2.

The control function of the motor control unit 260 is now explained in reference to FIG. 3.

The motor control unit 260 is an electronic device that is constituted by a plurality of electronic components including a microcomputer which are mounted on a circuit board. Together with the power module 210, a capacitor 220, the drive circuit 230, and the like, the motor control unit 260 is housed in the chassis of the inverter 200 and electrically connected to the drive circuit 230 via a signal line.

The microcomputer works in accordance with a program stored in a memory, generates the switching instruction based upon a plurality of input parameters, and outputs a signal corresponding to the switching instruction, which is a pulse width modulation (PWM) signal in the present embodiment. In addition, the microcomputer detects the magnetic flux of the permanent magnet 121 interlinked with the armature winding 111 and, based upon the result thereof, executes torque compensation, current limit, and the like.

The control function of the microcomputer is now described using functional blocks. The microcomputer includes processing units such as a current instruction generation unit 261, a current control unit 262, a two-phase/three-phase conversion unit 263, a PWM signal generation unit 264, a magnetic pole position/rotation speed detection unit 265, a three-phase/two-phase conversion unit 266, a flux control unit 400, and a current instruction correction unit 500, so as to perform the control processing described above.

The microcomputer receives the instruction signal having been output from the hybrid control unit 8, the voltage signal having been output from the voltage sensor 240, the current signals (corresponding to three phases) having been output from the current sensor 250, the rotational position signal having been output from the magnetic pole position sensor 130, and the temperature signal having been output from the temperature sensor 140. From those signals, the microcomputer obtains or detects a torque instruction value $\tau^*$, a DC voltage value $V_{dc}$, an AC current values $I_u$, $I_v$, and $I_w$, a rotational position $P_r$, and an armature winding temperature $T_a$, and performs calculation using them as input parameters to control the motor generator 100.

The rotational position $P_r$ is input to the magnetic pole position/rotation speed detection unit 265. Based upon the rotational position $P_r$, the magnetic pole position/rotation speed detection unit 265 detects a magnetic pole position (voltage phase) $\theta$ and a rotation speed $\omega$ of the magnetic field system 120. The magnetic pole position $\theta$ is input to the two-phase/three-phase conversion unit 263 and the three-phase/two-phase conversion unit 266. The rotation speed $\omega$ is input to the current instruction generation unit 261 and the flux control unit 400.

The AC current values $I_u$, $I_v$, and $I_w$ are input to the three-phase/two-phase conversion unit 266. Based upon the magnetic pole position $\theta$ and the AC current values $I_u$, $I_v$, and $I_w$, the three-phase/two-phase conversion unit 266 converts three AC amounts, which are the AC current values $I_u$, $I_v$, and $I_w$, to two DC amounts, which are a d-q axis rotating frame, i.e., a d axis (magnetic pole position (magnetic flux) component) current value $I_d$, and a q axis (a component perpendicular to the d axis and contributes to torque) current value $I_q$ and outputs them. Coordinate transformation is performed by an operation using a predetermined transformation equation. The d axis current value $I_d$ and the q axis current value $I_q$ are input to the current control unit 262 and the flux control unit 400.

The armature winding temperature $T_a$ is input to the flux control unit 400. In the field of motor control, the armature winding temperature $T_a$ is usually used to monitor the temperature of the motor generator 100 in order to protect overheat of the motor generator 100. That is, in the case where the armature winding temperature $T_a$ exceeds a preset temperature threshold, it is judged that a temperature abnormality has occurred and the drive of the motor generator 100 is stopped or limited. In the present embodiment, however, the armature winding temperature $T_a$ is used not only as the protection thereof but also as parameters to detect the magnetic flux of the permanent magnet 121 interlinked with the armature winding 111. According to the present embodiment, since the armature winding temperature $T_a$ is used, an interlinkage magnetic flux can be detected with a high degree of accuracy. Thus, in the present embodiment, an almost error-free torque as assumed in a torque instruction value can be output from the motor generator 100 and a highly accurate torque control can be achieved.

The torque instruction value $\tau^*$ is input to the current instruction generation unit 261. The current instruction generation unit 261 is provided in advance with a d axis current instruction value and q axis current instruction value table (map) having been set with the torque instruction value $\tau^*$ and the rotation speed $\omega$ as arguments. As a result, the current instruction generation unit 261 refers to the torque instruction value $\tau^*$ and the rotation speed $\omega$, searches and obtains the d axis current instruction value $I_d^*$ and the q axis current instruction value $I_q^*$ from the d axis current instruction value and q axis current instruction value table (map). The d axis current instruction value $I_d^*$ and the q axis current instruction value $I_q^*$ are input to the current instruction correction unit 500 and the flux control unit 400.

In addition to the d axis current instruction value $I_d^*$ and the q axis current instruction value $I_q^*$, a d axis current instruction correction value $I_d^{*\prime}$ and a q axis current instruction correction value $I_q^{*\prime}$, having been output from the flux control unit 400, are input to the current instruction correction unit 500. The current instruction correction unit 500 adds the d axis current instruction correction value $I_d^{*\prime}$ to the d axis current instruction value $I_d^*$, and adds the q axis current instruction correction value $I_q^{*\prime}$ to the q axis current instruction value $I_q$ so as to correct the d axis current instruction value $I_d^*$ and the q axis current instruction value $I_q^*$ and outputs the corrected d axis current instruction value $I_{da}^*$ and the corrected q axis current instruction value $I_{qa}^*$. The corrected d axis current instruction value $I_d^*$ and the corrected q axis current instruction value $I_{qa}^*$ are input to the current control unit 262.

The d axis current value $I_d$, the q axis current value $I_q$, the corrected d axis current instruction value $I_{da}^*$, and the corrected q axis current instruction value $I_{qa}^*$ are input to the current control unit 262. The current control unit 262 performs feedback control so that the d axis current value $I_d$ matches the corrected d axis current instruction value $I_{da}^*$, and the q axis current value $I_q$ matches the corrected q axis current instruction value $I_{qa}^*$. More specifically, the current control unit 262 operates and outputs the d axis voltage instruction value $V_d^*$ and the q axis voltage instruction value $V_q^*$ using a motor model equation for vector control so that the difference between the d axis current value $I_d$ and the corrected d axis current instruction value $I_{da}^*$, and the deviation (difference) between the q axis current value $I_q$ and the corrected q axis current instruction value $I_{qa}^*$ each become zero. The d axis voltage instruction value $V_d^*$ and the q axis voltage instruction value $V_q^*$ are input to the two-phase/three-phase conversion unit 263.

The DC voltage value $V_{dc}$, the magnetic pole position $\theta$, the d axis voltage instruction value $V_d^*$, and the q axis voltage instruction value $V_q^*$ are input to the two-phase/three-phase conversion unit 263. Based upon the DC voltage value $V_{dc}$ and the magnetic pole position $\theta$ having been input, the two-phase/three-phase conversion unit 263 converts the d axis voltage instruction value $V_d^*$ and the q axis voltage instruction value $V_q^*$ having been input thereto to three-phase voltage instruction values, i.e., a U phase voltage instruction value $V_u^*$, a V phase voltage instruction value $V_v^*$, and a W phase voltage instruction value $V_w^*$ and outputs them. Coordinate transformation is performed by an operation using a predetermined transformation equation. The U phase voltage instruction value $V_u^*$, the V phase voltage instruction value $V_v^*$, and the W phase voltage instruction value $V_w^*$ are input to the PWM signal generation unit 264.

Based upon comparison between modulated sine waves and triangle carrier waves of each of the phases based upon the U phase voltage instruction value $V_u^*$, the V phase voltage instruction value $V_v^*$, and the W phase voltage instruction value $V_w^*$ which have been input, the PWM signal generation unit 264 generates and outputs PWM signals of the upper and lower arms of each of the phases, $U1_{PWM}$, $U2_{PWM}$, $V1_{PWM}$, $V2_{PWM}$, $W1_{PWM}$, and $W2_{PWM}$, with dead time provided therein. The generated PWM signals, $U1_{PWM}$, $U2_{PWM}$, $V1_{PWM}$, $V2_{PWM}$, $W1_{PWM}$, and $W2_{PWM}$ are input to the drive circuit 230. The dead time is a period of time during which neither of the upper and lower arms turns on, which is provided so as to prevent the upper and lower arms from shorting due to the upper and lower arms turned on at the same time caused by delayed switching.

The PWM signals, $U1_{PWM}$, $U2_{PWM}$, $V1_{PWM}$, $V2_{PWM}$, $W1_{PWM}$, and $W2_{PWM}$, having been input to the drive circuit 230, are level-shifted, amplified, and the like at the drive circuit 230 into drive signals suitable for driving each of the switching semiconductor devices, and then supplied to the gate electrode of each of the switching semiconductor devices. Each of the switching semiconductor devices, to which the drive signals are input, is controlled to turn on and off. This causes DC electric power supplied from the battery 300 to be converted into three-phase AC electric power with a predetermined voltage and phase and to be supplied to the armature winding 111, and thus drive of the motor generator 100 is controlled.

Figure 4:
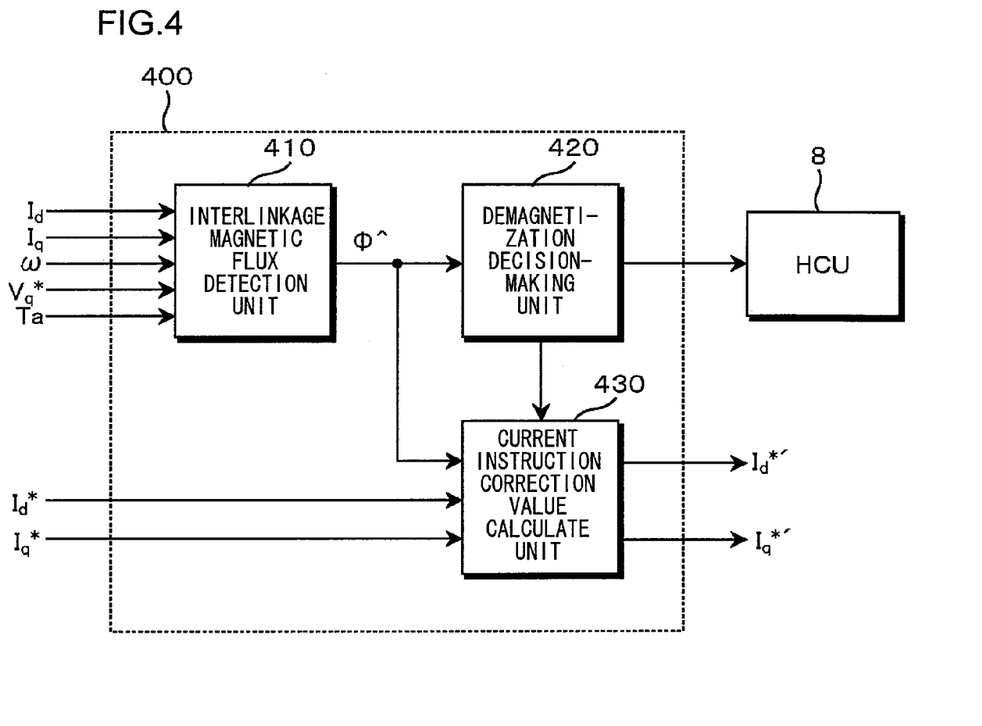
FIG. 4 shows the functional structure of the flux control unit shown in FIG. 3.
Figure 5:
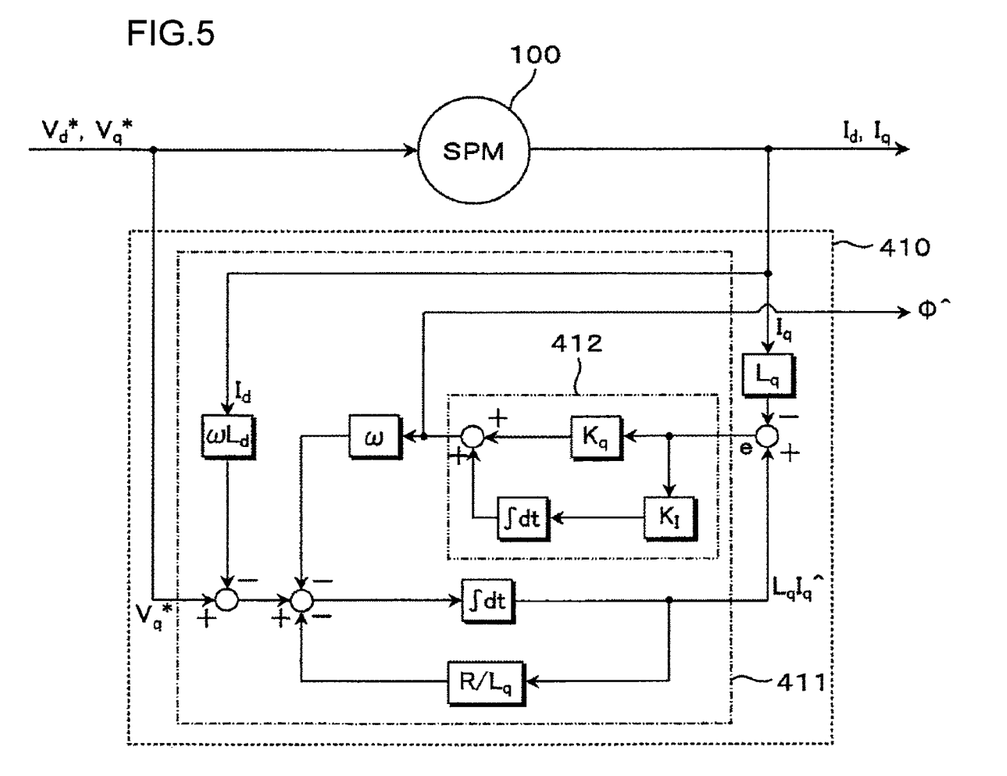
FIG. 5 shows the functional structure of the flux detection unit shown in FIG. 4.
Figure 6:
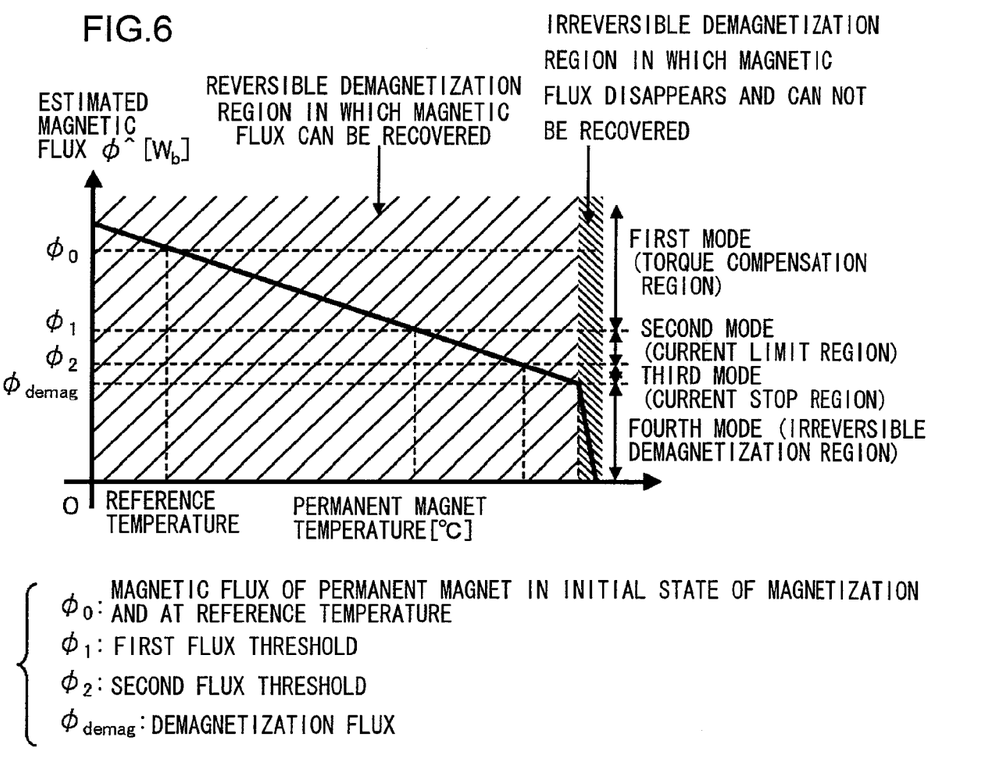
FIG. 6 shows the method of determination of a mode decision threshold, with the vertical axis indicating an estimated flux and with the horizontal axis indicating permanent magnet temperature, and thus showing the relationship between the flux value and the mode.

The processing function of the flux control unit 400 is now explained in reference to FIGS. 4 to 6.

When the permanent magnet 121, which is, for example, a neodymium magnet provided in the magnetic field system 120 of the motor generator 100, produces heat by eddy current generated on the surface and the temperature rises or the permanent magnet is influenced by the reversed magnetic field generated by current flowing through the armature winding 111, generation of the magnetic flux is reduced. Moreover, it may be demagnetized if the permanent magnet 121 is overheated. This results in a state in which a torque that satisfies a torque instruction value (value required by the driver) can not be output, or the like. Therefore, it is necessary to monitor the state of the permanent magnet 121, i.e., the state of the magnetic flux of the permanent magnet 121 that interlinks with the armature winding 111 and to perform compensation of decrement of the magnetic flux, i.e., torque compensation and current limit in response thereto. For this reason, in the present embodiment, a control function of the flux control unit 400 is added to the motor control unit 260 (microcomputer).

The flux control unit 400 is, as shown in FIG. 4, constituted by processing units such as an interlinkage magnetic flux detection unit 410, a demagnetization decision-making unit 420, and a current instruction correction value calculate unit 430, to which input parameters such as the d axis current instruction value $I_d^*$, the q axis current instruction value $I_q^*$, the d axis current value $I_d$, the q axis current value $I_q$, the q axis voltage instruction value $V_q^*$, the rotation speed ω, and the armature winding temperature $T_a$ are input.

The interlinkage magnetic flux detection unit 410 uses a flux observer 411 to estimate (detect) a flux estimation value (interlinkage magnetic flux) $\hat{\phi}$, with the d axis current value $I_d$, the q axis current $I_q$, the q axis voltage instruction value $V_q^*$, the rotation speed ω, and the armature winding temperature $T_a$ as input parameters. The flux observer 411 is constituted by a motor model and a proportional-integral (PI) compensator 412. The proportional-integral compensator 412 proportionally integrates an estimation error e, which is a deviation between an estimated current $L_q \hat{I}_q$, having been obtained through a calculation, and an actual current $L_q I_q$, so that the flux observer 411 calculates the flux estimation value (interlinkage magnetic flux) $\hat{\phi}$.

The motor model is set based upon a dq axis voltage equation expressed as equation (1).

$$p\begin{bmatrix} L_d I_d \\ L_q I_q \end{bmatrix} = \begin{bmatrix} -R/L_d & \omega \\ -\omega & -R/L_q \end{bmatrix} \begin{bmatrix} L_d I_d \\ L_q I_q \end{bmatrix} + \begin{bmatrix} V_d \\ V_q \end{bmatrix} + \begin{bmatrix} 0 \\ -\omega\phi \end{bmatrix} \quad (1)$$

$V_d$: d axis voltage value [V]
$V_q$: q axis voltage value [V]
$I_d$: d axis current value [A]
$I_q$: q axis current value [A]
$L_d$: d axis inductance value [H]
$L_q$: q axis inductance value [H]
R: armature winding phase resistance value [Ω]
ω: electrical angular speed [rad/s]
φ: effective value [Wb] of magnetic flux interlinking with armature winding
p: differential operator It is to be noted that the d axis inductance value $L_d$, the q axis inductance value $L_q$, and the armature winding phase resistance value R are preset values determined depending upon the specifications of the motor generator 100.

In equation (1), flux information is included only in a q axis voltage equation. Therefore, an equation for the motor model is the q axis voltage equation expressed as equation (2).

$$p(L_q \hat{I}_q) = -\omega L_d I_d - (L_q \hat{I}_q) R/L_q + V_q^* - \omega\hat{\phi} \quad (2)$$

$V_q^*$: q axis voltage instruction value [V]
$\hat{I}_q$: q axis current estimation value [A]
$I_d$: d axis current sensor value [A]
$\hat{\phi}$: flux estimation value [Wb]

As expressed in equation (3), the flux estimation value $\hat{\phi}$ can be obtained by proportionally integrating the estimation error e, which is a deviation between the estimated current $L_q \hat{I}_q$ and the actual current $L_q I_q$.

$$\hat{\phi} = K(L_q \hat{I}_q - L_q I_q) = Ke \quad (3)$$

K: gain

Here, the gain K expressed in equation (3) represents proportional-integral by the proportional-integral compensator 412. In the proportional-integral compensator 412, an operation result $K_p e$, which is the product of the estimation error e multiplied by a proportional gain $K_p$, is added by an adder to an operation result $K_I \int edt$, which is the estimation error e integrated by multiplying the estimation error e by an integral gain $K_I$, and the added result is output as the flux estimation value $\hat{\phi}$.

Substituting the flux estimation value $\hat{\phi}$ shown in equation (3) into the motor model equation (equation (2)) leads to an equation that expresses the structure of the flux observer 411 of the present embodiment, as expressed in equation (4).

$$p(L_q \hat{I}_q) = -\phi L_d I_d - (L_q \hat{I}_q) R/L_q + V_q^* - \omega(K_p e + K_I \int edt) \quad (4)$$

$K_p$: proportional gain
$K_I$: integral gain

It is to be noted that appropriately giving the proportional gain $K_p$ and the integral gain $K_I$ allows a flux estimation time to be arbitrarily set.

In the flux observer 411, as expressed by the second term of the right-hand side of equation (4), the armature winding phase resistance value R divided by the q axis inductance value. Then, the quotient thereof is multiplied by the estimated current $L_q \hat{I}_q$, and the product thereof is subtracted from the q axis voltage instruction value $V_q^*$. As described earlier, the armature winding phase resistance value R is a fixed value which is determined depending upon the specifications of the motor generator 100. However, the armature winding phase resistance value R varies with change in temperature. Therefore, the armature winding phase resistance value R used to detect an interlinkage magnetic flux with its fixed value causes an error and fails to accurately detect the interlinkage magnetic flux.

In the present embodiment, therefore, the armature winding phase resistance value R is corrected based upon the armature winding temperature $T_a$, having been input as an input parameter. In the present embodiment, in other words, the armature winding phase resistance value R is used not as a fixed value but as a variable value. This allows an error in the armature winding phase resistance value R to be reduced and allows an interlinkage magnetic flux to be accurately detected in the present embodiment.

As expressed in equation (5), the armature winding phase resistance value R is corrected using a resistance equation of copper wires.

$$Ra = (234.5 + Ta)/(234.5 + T_0) \times R_0 \quad (5)$$

Ra: corrected resistance value [Ω]
$T_a$: temperature sensor value [° C.]
$R_0$: reference resistance value [Ω]
$T_0$: reference temperature [° C.]

The corrected resistance value Ra is used as the armature winding phase resistance value R of the flux observer 411. The reference resistance value $R_0$, a value under the reference temperature $T_0$, is a fixed value determined depending upon the specifications of the motor generator 100. 234.5 is the temperature coefficient.

As described above, in the present embodiment, since the flux observer 411 is used to proportionally integrates the estimation error e, which is the deviation of the estimated current $L_q \hat{I}_q$ and the actual current $L_q I_q$, having been calculated, so as to calculate the flux estimation value (interlinkage magnetic flux) $\hat{\omega}$, it is allowed to detect not only a change of magnetic flux of the permanent magnet due to temperature but also a change of magnetic flux of the permanent magnet due to the reversed magnetic field over the permanent magnet, i.e., current flowing through the armature winding. Thus, the permanent magnet flux that interlinks with the armature winding is detected more accurately than using a conventional method in which an interlinkage magnetic flux is detected using a flux table for temperature of the permanent magnet or the armature winding, i.e., in which the temperature and the magnetic flux are in a one-to-one relationship.

In addition, according to the present embodiment, since a parameter obtained from an output from the sensor is used as an input parameter used to calculate the flux estimation value (interlinkage magnetic flux) $\hat{\phi}$, an error included in the input parameter can be reduced and thus the permanent magnet flux that interlinks with the armature winding is accurately detected. In other words, an estimation error is included in the method in which an input parameter is estimated, while it is not included in the present embodiment.

Furthermore, according to the present embodiment, since the armature winding phase resistance value R is corrected based upon the armature winding temperature $T_a$ so as to reduce an error in the armature winding phase resistance value R, the permanent magnet flux that interlinks with the armature winding is detected more accurately than using a conventional method in which an interlinkage magnetic flux is detected using a motor model or a flux estimator without considering armature winding temperature.

The flux estimation value $\hat{\phi}$ having been output from the interlinkage magnetic flux detection unit 410 is input to the demagnetization decision-making unit 420.

Based upon comparison between the flux estimation value $\hat{\phi}$ having been input and the first flux threshold, the second flux threshold, and a demagnetization flux, having been preset, the demagnetization decision-making unit 420 makes a decision as to whether the permanent magnet 121 is in a state in which it leads to irreversible demagnetization by the impact of over-temperature or over-current or whether, although the permanent magnet 121 is in an initial state of magnetization, the magnetic flux is changing by the impact of temperature (reversible demagnetization). In addition, based upon the above comparison, the demagnetization decision-making unit 420 makes a decision as to whether the state in which the permanent magnet 121 leads to irreversible demagnetization is a demagnetization preventable state in which the permanent magnet 121 can be prevented from being irreversibly demagnetized or a demagnetization unpreventable state in which the permanent magnet 121 ends up irreversible demagnetization.

It is to be noted that when the permanent magnet 121 has been irreversibly demagnetized, no torque is generated even if a current is applied to the armature winding 111 and the motor generator 100 fails.

Irreversible demagnetization of the permanent magnet 121 occurs when the estimated magnetic flux of the permanent magnet 121 becomes equal to or less than a predetermined magnetic flux. Accordingly, as shown in FIG. 6, the first flux threshold and the second flux threshold may be set based upon a magnetic flux (referred to as demagnetization flux) of the permanent magnet 121 irreversibly demagnetized. Namely, as a threshold used to make a decision as to whether the permanent magnet 121 is in a state in which it leads to irreversible demagnetization by the impact of over-temperature or over-current or whether, although the permanent magnet 121 is in an initial state of magnetization, the magnetic flux is changing by the impact of temperature, the first flux threshold is set to a value that is greater than the demagnetization flux, greater than the second flux threshold, and less than the flux in the initial state of magnetization of the permanent magnet 121 and at the reference temperature. More specifically, in consideration of a current limit value of the switching semiconductor device of the inverter 200 and the like, the first flux threshold may be set to any extent sufficient to perform the torque compensation described below. The reference temperature, having a value which is determined depending upon the specifications of the motor generator 100, is a temperature of the permanent magnet 121 in current instruction value matching, i.e., when preparing a table (map) of current instruction value. As a threshold used to make a decision as to whether the permanent magnet 121 is in a state in which it could lead to irreversible demagnetization, the second flux threshold is set to a value that is greater than the demagnetization flux and less than the first flux threshold. More specifically, the second flux threshold may be set to an extent where irreversible demagnetization can not be avoided even if the current limit described below is performed.

In the case where the flux estimation value $\hat{\phi}$ is greater than the first flux threshold (first flux threshold<flux estimation value $\hat{\phi}$), the demagnetization decision-making unit 420 judges that the permanent magnet 121 is in a first mode, i.e., although the permanent magnet 121 is in an initial state of magnetization, the magnetic flux is changing by the impact of temperature.

In the case where the flux estimation value $\hat{\phi}$ is equal to or less than the first flux threshold and greater than the second flux threshold (second flux threshold<flux estimation value $\hat{\phi} \leq$ first flux threshold), the demagnetization decision-making unit 420 judges that the permanent magnet 121 is in a second mode, i.e., the permanent magnet 121 may lead to irreversible demagnetization by the impact of over-temperature or over-current and the permanent magnet 121 is in the demagnetization preventable state in which the permanent magnet 121 can be prevented from being irreversibly demagnetized.

In the case where the flux estimation value $\hat{\phi}$ is greater than the demagnetization flux and equal to or less than the second flux threshold (demagnetization flux<flux estimation value $\hat{\phi} \leq$ second flux threshold), the demagnetization decision-making unit 420 judges that the permanent magnet 121 is in a third mode, i.e., the permanent magnet 121 is on the verge of irreversible demagnetization by the impact of over-temperature or over-current and in the demagnetization preventable state in which the permanent magnet 121 is prevented from being irreversibly demagnetized.

In the case where the flux estimation value $\hat{\phi}$ is equal to or less than the demagnetization flux (flux estimation value $\hat{\phi} \leq$ demagnetization flux), the demagnetization decision-making unit 420 judges that the permanent magnet 121 is in a fourth mode, i.e., the permanent magnet 121 leads to irreversible demagnetization by the impact of over-temperature or over-current and the permanent magnet 121 is in the demagnetization unpreventable state in which the permanent magnet 121 ends up irreversible demagnetization.

In the case where the demagnetization decision-making unit 420 judges that the permanent magnet 121 is in the first mode, torque corresponding to the torque instruction value can be output from the motor generator 100 by controlling current so as to compensate decrement in interlinkage magnetic flux. Thus, torque compensation is performed. For this reason, the demagnetization decision-making unit 420 outputs an instruction to the current instruction correction value calculate unit 430 so as to instruct calculation of the current instruction correction value.

Since the magnitude of torque depends upon magnetic flux and a current, a change in the magnetic flux may be compensated by the current. Using the flux estimation value $\hat{\phi}$, a current correction value is calculated from the difference in torque before and after flux change.

Here, a torque T is expressed in equation (6), where T denotes a torque before flux change.

$$T = P\phi I_q^* + P(L_d - L_q) I_d^* I_q^* \qquad (6)$$

P: pairs of poles (the number of permanent magnets/2)
$\phi$: flux value [Wb] at reference temperature
$L_d$: d axis inductance value [H]
$L_q$: q axis inductance value [H]
$I_d^*$: d axis current instruction value [A]
$I_q^*$: q axis current instruction value [A]

It is to be noted that the d axis inductance value $L_d$ and the q axis inductance value $L_q$ are preset values determined depending upon the specifications of the motor generator 100.

The flux value φ at reference temperature, also determined depending upon the specifications of the motor generator 100, is used in current instruction value matching, i.e., when a current instruction value table (map) is prepared.

A torque T' is expressed in equation (7), where T' denotes a torque after flux change.

$$T' = P\phi\hat{}\, I_q^* + P(L_d - L_q) I_d^* I_q^* \tag{7}$$

φ^: flux estimation value (magnetic flux at present) [Wb]

A torque error ΔT is expressed in equation (8) from equation (6) and equation (7).

$$\Delta T = P I_q^* (\phi - \phi\hat{}\,) = P I_q^* \Delta\phi \tag{8}$$

According to equation (8), the torque error ΔT is generated by a flux change Δφ, and can be compensated by correcting the q axis current (torque current).

If the torque T' and the q axis current instruction value $I_q^*$ in equation (7) are replaced by the torque error ΔT and the q axis current instruction correction value $I_q$ respectively, equation (7) is expressed as equation (9).

$$\Delta T = P\phi\hat{}\, I_q^{*\prime} + P(L_d - L_q) I_d^* I_q^{*\prime} \tag{9}$$

Equation (9) is transformed into equation (10).

$$I_q^{*\prime} = \frac{\Delta T}{P\phi\hat{}\, + P(L_q - L_d) I_d^*} \tag{10}$$

Substituting equation (8) into equation (10) results in equation (11) that is used to calculate the q axis current instruction correction value $I_q^{*\prime}$ or the torque error ΔT.

$$I_q^{*\prime} = \frac{I_q^* \Delta\phi}{\phi\hat{}\, + (L_q - L_d) I_d^*} \tag{11}$$

Accordingly, when the demagnetization decision-making unit 420 judges that the permanent magnet 121 is in the first mode, the current instruction correction value calculate unit 430 inputs thereto the flux estimation value φ^, the d axis current instruction value $I_d^*$, and the q axis current instruction value $I_q^*$ as input parameters, and uses the operational expression shown as equation (11) so as to calculate the q axis current instruction correction value $I_q^{*\prime}$. The q axis current instruction correction value $I_q^{*\prime}$ having been calculated is output to the current instruction correction unit 500. The current instruction correction unit 500 adds the q axis current instruction correction value $I_q^{*\prime}$ to the q axis current instruction value $I_q^*$ ($I_q^* + I_q^{*\prime}$), and outputs the corrected q axis current instruction value $I_{qa}^*$ to the current control unit 262. At this time, the d axis current instruction correction value $I_d^{*\prime}$ is zero. As a result, the current instruction correction unit 500 outputs the d axis current instruction value $I_d^*$ to the current control unit 262 as the corrected d axis current instruction value $I_{da}^*$.

According to the present embodiment, since torque compensation is performed using the operational expression shown as equation (11) based upon the flux estimation value φ^, the d axis current instruction value $I_d^*$, and the q axis current instruction value $I_q^*$, a torque that is almost equal to the torque instruction value, i.e., a torque with a very small error to the torque instruction value is output from the motor generator 100. This enables a highly accurate torque control in the present embodiment. Moreover, since an interlinkage magnetic flux is detected with a high degree of accuracy in the present embodiment, a torque control is achieved with a higher degree of accuracy.

When the demagnetization decision-making unit 420 judges that the permanent magnet 121 is in the second mode, current flowing through the armature winding 111 of the motor generator 100 is limited so as to prevent irreversible demagnetization of the permanent magnet 121. Therefore, the demagnetization decision-making unit 420 outputs an instruction to the current instruction correction value calculate unit 430 so that the current instruction correction value calculate unit 430 outputs a current instruction correction value to the current instruction correction unit 500. At this time, the d axis current instruction correction value $I_d^{*\prime}$ and the q axis current instruction correction value $I_q^{*\prime}$ may be set based upon the relationship between current flowing through the armature winding 111 of the motor generator 100 and flux change in the permanent magnet 121 due to the current. They may be either set as a single value or selected from among a plurality of values in response to the flux estimation value φ^.

When the demagnetization decision-making unit 420 judges that the permanent magnet 121 is in the second mode, torque that is output from the motor generator 100 by the current limit is reduced. At this time, the demagnetization decision-making unit 420 transmits a signal to notify that irreversible demagnetization of the permanent magnet 121 is avoided and a signal to request torque compensation performed by the engine 4 to the hybrid control unit 8 so as to compensate a torque decrement in the motor generator 100 with torque of the engine 4. Based upon a signal having been output from the demagnetization decision-making unit 420, the hybrid control unit 8 calculates torque compensation performed by the engine 4 and outputs a signal corresponding to an engine torque instruction value to the engine control unit with the torque compensation amount added to the engine torque instruction value. In addition, the hybrid control unit 8 notifies the driver that drive of the motor generator 100 is limited due to current limit. Notification methods include displaying on a monitor placed in front of the driver seat, turning on a lamp, and the like.

According to the present embodiment, since current flowing through the armature winding 111 of the motor generator 100 is limited (not to apply a predetermined current corresponding to the torque instruction value) when the demagnetization decision-making unit 420 judges that the permanent magnet 121 is in the second mode, the permanent magnet 121 can be prevented from being irreversibly demagnetized, and failure of the motor generator 100 due to irreversible demagnetization of the permanent magnet 121 can be prevented.

Moreover, according to the present embodiment, since torque of the motor generator 100 can compensate its decrement with torque of the engine 4, travel of the vehicle is not affected.

It is to be noted that since a pure electric vehicle does not have an engine, performance recovery of the motor generator 100 is awaited by degenerative travel of the vehicle using torque that the motor generator 100 can outputs or by safely stopping the vehicle.

In addition, a method in which current flowing through the armature winding 111 of the motor generator 100 is limited is adopted in the present embodiment as a measure to avoid irreversible demagnetization of the permanent magnet 121. There is also a method in which the rotational speed of the motor generator 100 is limited as another measure to avoid irreversible demagnetization of the permanent magnet 121. Since the rotational speed limit method of the motor generator 100 reduces the loss due to core loss of the permanent magnet 121, it is effective to limit the temperature rise. However, since the rotational speed limit method of the motor generator 100 can not be adopted in some vehicles, the current limit method is more preferable as a measure to avoid demagnetization of the permanent magnet 121. According to the circumstances, the current limit method and the rotational speed limit method of the motor generator 100 may be adopted in combination.

When the demagnetization decision-making unit 420 judges that the permanent magnet 121 is in the third mode, current is not allowed to flow through the armature winding 111 of the motor generator 100 and thus the motor generator 100 is deactivated so as to prevent irreversible demagnetization of the permanent magnet 121. Therefore, the demagnetization decision-making unit 420 outputs an instruction to the current instruction correction value calculate unit 430 so that the current instruction correction value calculate unit 430 outputs a current instruction correction value to the current instruction correction unit 500. At this time, the d axis current instruction correction value $I_d^{*\prime}$ and the q axis current instruction correction value $I_q^{*\prime}$, are set based upon the d axis current instruction value $I_d^*$ and the q axis current instruction value $I_q^*$ so that the d axis current instruction value $I_d^*$ and the q axis current instruction value $I_q^*$ become equal to zero. In other words, the signs of the d axis current instruction value $I_d^*$ and the q axis current instruction value $I_q^*$ may be reversed by a reversing circuit and used as the d axis current instruction correction value $I_d^{*\prime}$ and the q axis current instruction correction value $I_q^{*\prime}$. This causes current not to flow through the armature winding 111 of the motor generator 100, and thus the motor generator 100 is deactivated.

According to the present embodiment, since the motor generator 100 is deactivated (not to apply a current) when the demagnetization decision-making unit 420 judges that the permanent magnet 121 is in the third mode, the permanent magnet 121 can be prevented from being irreversibly demagnetized, and failure of the motor generator 100 due to irreversible demagnetization of the permanent magnet 121 can be prevented.

Moreover, according to the present embodiment, since the vehicle is driven only by torque of the engine 4, travel of the vehicle is not affected.

It is to be noted that since a pure electric vehicle does not have an engine, performance recovery of the motor generator 100 is awaited by safely stopping the vehicle.

When the demagnetization decision-making unit 420 judges that the permanent magnet 121 is in the fourth mode, torque can not be output from the motor generator 100. At this time, the demagnetization decision-making unit 420 outputs a signal to notify that the motor generator 100 is deactivated in order to avoid irreversible demagnetization of the permanent magnet 121, a signal to request a vehicle drive only by torque of the engine 4, and a signal to inhibit shutdown the engine 4 as the vehicle stops to the hybrid control unit 8 so that the vehicle is driven only by torque of the engine 4 and so that the engine 4 is not deactivated even while the vehicle is stationary. Based upon the signals having been output from the demagnetization decision-making unit 420, the hybrid control unit 8 generates an engine torque instruction value so that the vehicle is driven only by torque of the engine 4 and outputs a signal corresponding to the engine torque instruction value to the engine control unit, and, while the vehicle is stationary, inhibits shutdown of the engine 4. In addition, the hybrid control unit 8 notifies the driver that the motor generator 100 is deactivated and the vehicle is driven only by torque of the engine 4 and shutdown of the engine 4 is inhibited. Notification methods include displaying on a monitor placed in front of the driver seat, turning on a lamp, and the like.

As described above, according to the present embodiment, since the magnetic flux of the permanent magnet 121 that interlinks with the armature winding 111 is monitored, irreversible demagnetization of the permanent magnet 121 is detected and obviated. In the case of demagnetization, the hybrid control unit 8 is notified therewith so as to appropriately control the vehicle. Thus, according to the present embodiment, a highly reliable motor generator drive system can be provided.

What is claimed is:

1. A controller for rotating electrical machines, the controller used in a system comprising a rotating electrical machine and a power converter, the rotating electrical machine provided with an armature including a winding and a magnetic field system including a permanent magnet, the power converter electrically connected to the winding of the armature and controlling electric power which is input to or output from the winding of the armature by a switching semiconductor device, the controller controlling operation of the power converter so as to control operation of the rotating electrical machine, comprising:

a processing unit, to which a plurality of parameters are input, for generating a switching instruction to control a switching operation of the switching semiconductor device and outputting a signal corresponding to the switching instruction to the power converter, wherein:

the processing unit includes at least a function to input thereto signals having been output from each of sensors such as a current sensor to detect current passed between the power converter and the winding of the armature, a temperature sensor to detect temperature of the winding of the armature, and a magnetic pole position sensor to detect magnetic pole position of the magnetic field system, and, based upon information on current, temperature, and rotation speed of the rotating electrical machines, having been obtained from those sensor signals, detects a magnetic flux that interlinks with the winding of the armature from the permanent magnet;

a resistance value of the winding of the armature is preset in the processing unit as a value necessary for detection of the interlinkage magnetic flux; and the processing unit corrects the winding resistance value based upon the temperature information.

2. A controller for rotating electrical machines, the controller used in a system comprising a rotating electrical machine and a power converter, the rotating electrical machine provided with an armature including a winding and a magnetic field system including a permanent magnet, the power converter electrically connected to the winding of the armature and controlling electric power which is input to or output from the winding of the armature by a switching semiconductor device, the controller controlling operation of the power converter so as to control operation of the rotating electrical machine, comprising:

a processing unit, to which a plurality of parameters are input, for generating a switching instruction to control a switching operation of the switching semiconductor device and outputting a signal corresponding to the switching instruction to the power converter, wherein:

the processing unit includes at least a function to input thereto signals having been output from each of sensors such as a current sensor to detect current passed between the power converter and the winding of the armature, a temperature sensor to detect temperature of the winding of the armature, and a magnetic pole position sensor to detect magnetic pole position of the magnetic field system, and, based upon information on current, temperature, and rotation speed of the rotating electrical machines, having been obtained from those sensor signals, detects a magnetic flux that interlinks with the winding of the armature from the permanent magnet; and the processing unit includes a flux observer that is constituted by a model of the rotating electrical machine and a proportional integrator, and detects the interlinkage magnetic flux by using the flux observer.

3. A controller for rotating electrical machines, the controller used in a system comprising a rotating electrical machine and a power converter, the rotating electrical machine provided with an armature including a winding and a magnetic field system including a permanent magnet, the power converter electrically connected to the winding of the armature and controlling electric power which is input to or output from the winding of the armature by a switching semiconductor device, the controller controlling operation of the power converter so as to control operation of the rotating electrical machine, comprising:

a processing unit, to which a plurality of parameters are input, for generating a switching instruction to control a switching operation of the switching semiconductor device and outputting a signal corresponding to the switching instruction to the power converter, wherein:

the processing unit includes at least a function to input thereto signals having been output from each of sensors such as a current sensor to detect current passed between the power converter and the winding of the armature, a temperature sensor to detect temperature of the winding of the armature, and a magnetic pole position sensor to detect magnetic pole position of the magnetic field system, and, based upon information on current, temperature, and rotation speed of the rotating electrical machines, having been obtained from those sensor signals, detects a magnetic flux that interlinks with the winding of the armature from the permanent magnet;

a magnitude of magnetic flux between a magnetic flux in an initial state of magnetization of the permanent magnet and a magnetic flux when demagnetization of the permanent magnet occurs is preset in the processing unit as a first flux threshold; and when the interlinkage magnetic flux having been detected is greater than the first flux threshold and less than the magnetic flux in the initial state of magnetization of the permanent magnet, the processing unit increases a component of current flowing through the winding of the armature, the component affecting torque of the rotating electrical machine.

4. A controller for rotating electrical machines according to claim 3, wherein:

a magnitude of magnetic flux less than the first flux threshold, between the magnetic flux in the initial state of magnetization of the permanent magnet and the magnetic flux when demagnetization of the permanent magnet occurs, is preset in the processing unit as a second flux threshold; and when the interlinkage magnetic flux having been detected is equal to or less than the first flux threshold and less than the second flux threshold, the processing unit limits current flowing through the winding of the armature so as to limit an output of the rotating electrical machine.

5. A controller for rotating electrical machines according to claim 4, wherein:

when the interlinkage magnetic flux having been detected is equal to or less than the second flux threshold and greater than the magnetic flux when demagnetization of the permanent magnet occurs, the processing unit deactivates the rotating electrical machine.

6. A controller for rotating electrical machines, the controller used in a system comprising a rotating electrical machine and a power converter, the rotating electrical machine provided with an armature including a winding and a magnetic field system including a permanent magnet, the power converter electrically connected to the winding of the armature and controlling electric power which is input to or output from the winding of the armature by a switching semiconductor device, the controller controlling operation of the power converter so as to control operation of the rotating electrical machine, comprising:

a processing unit, to which a plurality of parameters are input, for generating a switching instruction to control a switching operation of the switching semiconductor device and outputting a signal corresponding to the switching instruction to the power converter, wherein:

the processing unit includes a function to detect a magnetic flux that interlinks with the winding of the armature from the permanent magnet, and a magnitude of magnetic flux between a magnetic flux in an initial state of magnetization of the permanent magnet and a magnetic flux when demagnetization of the permanent magnet occurs is preset in the processing unit as a first flux threshold; and when the interlinkage magnetic flux having been detected is greater than the first flux threshold and less than the magnetic flux in the initial state of magnetization of the permanent magnet, the processing unit increases a component of current flowing through the winding of the armature, the component affecting torque of the rotating electrical machine.

7. A controller for rotating electrical machines according to claim 6, wherein:

a magnitude of magnetic flux less than the first flux threshold, between the magnetic flux in the initial state of magnetization of the permanent magnet and the magnetic flux when demagnetization of the permanent magnet occurs, is preset in the processing unit as a second flux threshold; and when the interlinkage magnetic flux having been detected is equal to or less than the first flux threshold and less than the second flux threshold, the processing unit limits current flowing through the winding of the armature so as to limit an output of the rotating electrical machine.

8. A controller for rotating electrical machines according to claim 7, wherein:

when the interlinkage magnetic flux having been detected is equal to or less than the second flux threshold and greater than the magnetic flux when demagnetization of the permanent magnet occurs, the processing unit deactivates the rotating electrical machine.

* * * * *